M. BRAND & C. P. HOFFMAN.
MASH MACHINE.

No. 60,330. Patented Dec. 11, 1866.

UNITED STATES PATENT OFFICE.

M. BRAND AND C. P. HOFFMAN, OF CHICAGO, ILLINOIS.

IMPROVED MASH-MACHINE.

Specification forming part of Letters Patent No. 60,330, dated December 11, 1866.

*To all whom it may concern:*

Be it known that we, MICHAEL BRAND and C. P. HOFFMAN, of Chicago, in the county of Cook and State of Illinois, have invented a new and useful Improvement on Mash-Machines; and we do hereby declare that the following is a full, clear, and exact description of the construction and operation of the same, reference being had to the annexed drawings, making part of this specification, in which—

Figure 2:
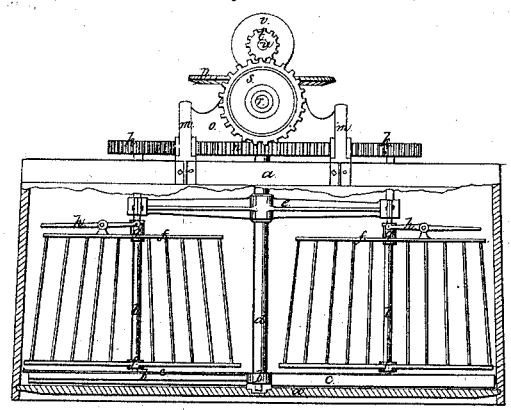
Figure 1:
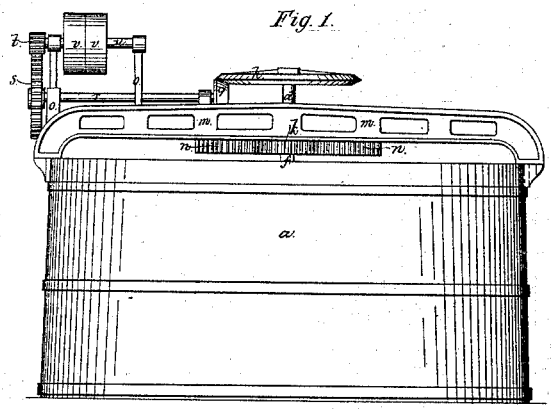
Figure 4:
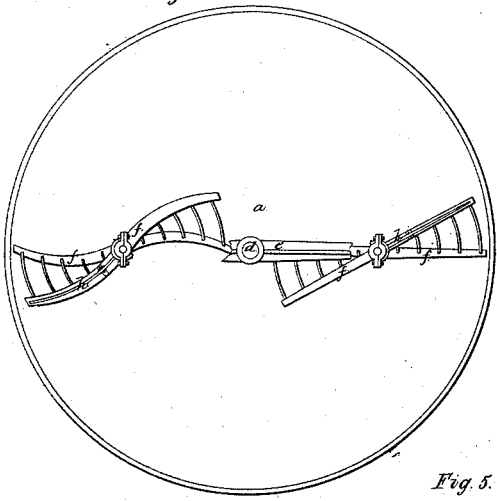
Figure 3:
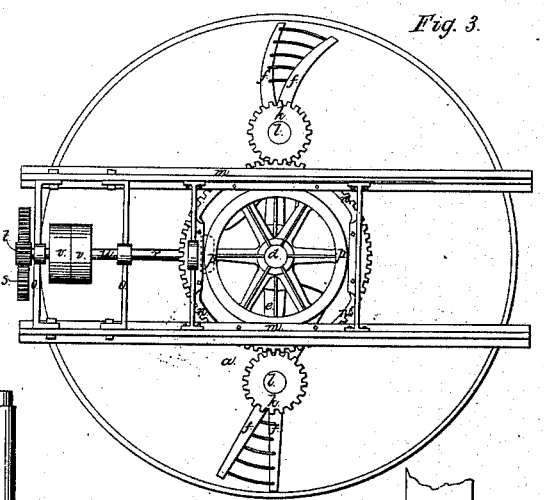
Figure 5:
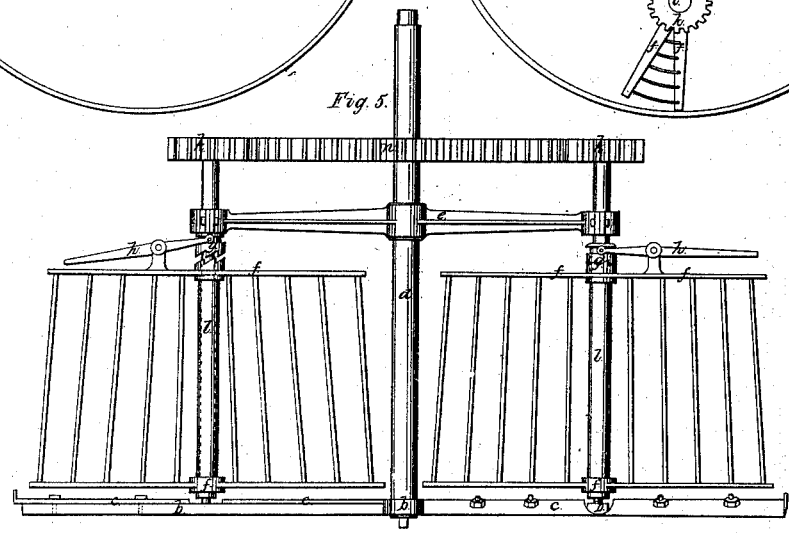
Figure 6:
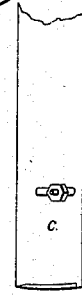
Figure 7:

Figure 1 is an elevation. Fig. 2 is a longitudinal section. Fig. 3 is a plan. Fig. 4 is a transverse section. Fig. 5 is a view of the stirrer and scraper in larger scale; Figs. 6 and 7, top view and section of scraper.

$a$ represents a wooden tub; $b$, a cast-iron scraper-holder, to which the adjustable scraper $c$ is bolted; $d$, a wrought-iron vertical main shaft; $e$, a cast-iron arm containing two shaft-boxes. $f$ represents two propeller-like-shaped wings or stirrers with lower part of clutch; $g$, clutch; $h$, clutch-lever; $k$, pinions; $l$, two vertical wing-shafts; $m$, cast-iron main frame; $n$, stationary spur-wheel bolted to main frame; $o$, two intersections with boxes; $p$ and $q$, bevel wheel and pinion; $r$, intermediate shaft; $s$ and $t$, driving spur wheel and pinion; $u$, driving-shaft; $v$, driving-pulley.

The operation is as follows: The pulley $v$, receiving power, sets the driving-shaft $u$ in motion. This, by means of spur, bevel-wheels, and pinions, gives action to the main shaft. To this main shaft are keyed two cast-iron arms, $e$ and $b$, containing two wing-shafts, which move the wings in the direction of the main shaft. But as these wing-shafts are provided with pinions $k$, to gear in the stationary spur-wheel $u$, they are compelled to perform a double revolution—first, around the main shaft, and, second, around the wing-shaft; and by this the mash will be thoroughly stirred.

On the lower part of the main shaft is keyed an arm or scraper-holder, $b$, to which an adjustable scraper is bolted. By means of oblong holes in this scraper it can be regulated to any desirable position. The service performed by this scraper is to scrape up the mash and prevent it from settling to the bottom of the tub.

The upper arm $e$ is provided with a clutch, $g\ h$, &c. The object of this clutch is to shift the wings out of gear in case the mass should become too compact to work.

In applying these improvements, the malt or mash will be more thoroughly stirred and worked, thereby producing a much greater quantity of saccharine, and thereby saving at least five per cent. malt. Compared with other machines for making mash, it is the more durable, works easier, and can be purchased for much less.

What we claim as our improvement, and desire to secure by Letters Patent, is—

1. The adjustable scraper on bottom of tub.
2. The vertical propeller-shaped wings, in combination with the machine.

MICH. BRAND.
C. P. HOFFMANN.

Witnesses:
CYRUS M. FERTIG,
JOHN B. MOOS.